(12) United States Patent
Singh et al.

(10) Patent No.: US 12,431,019 B2
(45) Date of Patent: Sep. 30, 2025

(54) PROACTIVE AUTOMOTIVE ASSISTANT

(71) Applicant: Cerence Operating Company, Burlington, MA (US)

(72) Inventors: Kuldeep Singh, Aachen (DE); Dhruv Gupta, Aachen (DE); Éric Lesage, Aachen (DE); Oliver Bender, Aachen (DE); Nils Lenke, Aachen (DE); Vanessa Tobisch, Ried (DE)

(73) Assignee: CERENCE OPERATING COMPANY, Burlington, MA (US)

( * ) Notice: Subject to any disclaimer, the term of this patent is extended or adjusted under 35 U.S.C. 154(b) by 772 days.

(21) Appl. No.: 17/693,495

(22) Filed: Mar. 14, 2022

(65) Prior Publication Data
US 2022/0321694 A1 Oct. 6, 2022

Related U.S. Application Data

(60) Provisional application No. 63/168,020, filed on Mar. 30, 2021.

(51) Int. Cl.
| | | |
|---|---|---|
| *G08G 1/0967* | (2006.01) | |
| *B60R 16/023* | (2006.01) | |
| *B60R 16/037* | (2006.01) | |
| *G08G 1/0962* | (2006.01) | |
| *H04M 1/72454* | (2021.01) | |

(Continued)

(52) U.S. Cl.
CPC ..... *G08G 1/096716* (2013.01); *B60R 16/023* (2013.01); *B60R 16/037* (2013.01); *G08G 1/09626* (2013.01); *G08G 1/09675* (2013.01); *G08G 1/096775* (2013.01); *H04M 1/72454* (2021.01); *H04M 1/72463* (2021.01);

(Continued)

(58) Field of Classification Search
CPC ......... G08G 1/096716; G08G 1/09626; G08G 1/09675; B60R 16/023; B60R 16/037; H04M 1/72454; H04M 1/72463; H04W 4/40
See application file for complete search history.

(56) References Cited

U.S. PATENT DOCUMENTS 7,174,248 B2 * 2/2007 Suzuki ............... G01C 21/3697
701/96
9,420,432 B2 * 8/2016 Matthews, III ... H04M 1/72463
(Continued)

FOREIGN PATENT DOCUMENTS

EP 1467543 B1 * 9/2006 .......... H04M 1/6075

OTHER PUBLICATIONS

Translation of EP-1467543-B1, 9 pages (Year: 2006).*

*Primary Examiner* — Dale W Hilgendorf
(74) *Attorney, Agent, or Firm* — Burr & Forman

(57) ABSTRACT

An apparatus comprising an infotainment system including a proactive automotive assistant that executes a first action and a second action, wherein the first action is that of permitting spontaneous communication to an occupant in a vehicle and the second action is that of providing information indicating that spontaneous communication with the occupant is impermissible. The automotive assistant is configured to receive information selected from the group consisting of vehicle-status information concerning operation of the vehicle and occupant-status information concerning the occupant and to base the first and second actions at least in part on the information.

20 Claims, 5 Drawing Sheets

(51) Int. Cl.
*H04M 1/72463* (2021.01)
*H04M 3/42* (2006.01)
*H04W 4/16* (2009.01)
*H04W 4/40* (2018.01)

(52) U.S. Cl.
CPC ......... *H04M 3/42017* (2013.01); *H04W 4/16* (2013.01); *H04W 4/40* (2018.02)

(56) References Cited

U.S. PATENT DOCUMENTS

| | | | | |
|---|---|---|---|---|
| 9,807,559 | B2* | 10/2017 | Clark | H04M 1/72454 |
| 2007/0041552 | A1* | 2/2007 | Moscato | H04M 1/72454 |
| | | | | 379/214.01 |
| 2011/0028137 | A1* | 2/2011 | Moshrefi | G06Q 30/02 |
| | | | | 455/418 |
| 2013/0274997 | A1* | 10/2013 | Chien | H04W 4/02 |
| | | | | 701/36 |
| 2014/0136187 | A1* | 5/2014 | Wolverton | G06F 16/3329 |
| | | | | 704/9 |
| 2015/0382147 | A1* | 12/2015 | Clark | H04W 4/025 |
| | | | | 455/414.1 |
| 2016/0360382 | A1* | 12/2016 | Gross | G06F 3/0488 |
| 2017/0034649 | A1* | 2/2017 | Dotan-Cohen | H04M 1/72454 |
| 2017/0127255 | A1* | 5/2017 | Archer | H04W 4/16 |
| 2017/0182956 | A1* | 6/2017 | Naboulsi | G06F 3/0227 |
| 2019/0029002 | A1* | 1/2019 | Kotzer | H04L 67/12 |
| 2020/0211387 | A1* | 7/2020 | Noy | G01C 21/3629 |
| 2024/0010070 | A1* | 1/2024 | Kaluza | G01C 21/3697 |

* cited by examiner

PROACTIVE AUTOMOTIVE ASSISTANT

CROSS-REFERENCE TO RELATED APPLICATIONS

This application claims the benefit of the Mar. 30, 2021 priority date of U.S. Provisional Application No. 63/168,020, which is incorporated herein by reference.

BACKGROUND

It is known in the art to have a computer-implemented assistant that carries out various instructions in response to user input. Such assistants are able to launch applications, look up various facts, plot routes between points, and similar tasks.

Such computer-implemented assistants are common on smart phones. In such cases, the user spontaneously utters a wake word followed by a request for information. The assistant then looks up the required information and delivers it, typically using a speech interface.

Such assistants are useful for such tasks as announcing the time, weather conditions, looking up dictionary definitions, finding recipes, and similar tasks. What these assistants have in common is that they are essentially passive. They act only in response to a user's request.

SUMMARY

The invention relate to a proactive automotive assistant that executes on an infotainment system in an automobile. Such an automotive assistant uses its knowledge of the environment and of the vehicle occupant to anticipate the information needs of an occupant in the vehicle.

In some embodiments, the proactive assistant initiates a dialog with a user to share information about features that are deeply hidden within a vehicle infotainment system's menu structure. Among these are features that the user may and in particular, those features that arise as a result of an over-the-air update to the system.

In one aspect, the invention features an infotainment system that includes a proactive automotive assistant that executes a first action and a second action. The first action is that of permitting spontaneous communication to an occupant in a vehicle. The second action is that providing information indicating that spontaneous communication with said occupant is impermissible. The automotive assistant is also configured to receive either vehicle-status information concerning operation of said vehicle or occupant-status information concerning said occupant and to base the first and second actions at least in part on that information or a combination thereof.

In another aspect, the invention features a proactive automotive assistant that executes on an infotainment system of a vehicle. Such an automotive assistant determines whether it is appropriate to spontaneously communicate with an occupant of the vehicle.

In yet another aspect, the invention features an apparatus comprising an infotainment system that comprises a proactive automotive assistant that executes a first action and a second action, wherein the first action is that of permitting spontaneous communication to an occupant in a vehicle and the second action is that providing information indicating that spontaneous communication with the occupant is impermissible.

In some embodiments, the automotive assistant is configured to receive status information concerning operation of vehicle and to base at least one of the first and second actions on the status information. Among these are embodiments in which the status information comprises information indicating that there has been a change in the traffic conditions in which the vehicle is operating such that the vehicle is now operating in heavier traffic than it used to or lighter traffic that it used to. Also among these embodiments are those in which the status information comprises information indicating that the vehicle is operating in higher-than-average traffic or information indicative of any one or more of the vehicle's velocity, position, or trajectory.

In some embodiments, the automotive assistant is configured to receive status information concerning the occupant and to base the first and second actions on the status information. Among these embodiments are those in which the status information indicates that the occupant is engaged in a conversation, those in which the status information indicates that the occupant is using a telephone, and those in which the status information indicates an estimated cognitive load experienced by the occupant.

Other embodiments are those in which, after having executed the first action, the automotive assistant selects a communication mode for spontaneous communication. Among these embodiments are those in which the communication mode is based at least in part on an urgency of the communication, those in which the communication mode is based at least in part on an estimate of the occupant's cognitive load, those in which it is based on a combination of the foregoing, and those in which the communication mode is independent of the occupant's cognitive load.

Is some embodiments, the spontaneous communication is a communication that draws the occupant's attention to a feature of the vehicle.

Embodiments include those in which the infotainment system comprises a head unit in the vehicle and a remote server that is in data communication with the head unit as well as those in which the infotainment system is local to the vehicle.

In another aspect, the invention features a non-transitory computer-readable medium that comprises matter and that has, encoded therein, instructions that, when executed by an infotainment system, cause the infotainment system to execute an automotive assistant that executes a first action and a second action, the first action being that of permitting spontaneous communication to an occupant in a vehicle and the second action being that of suppressing spontaneous communication to the occupant.

In another aspect, the invention features a method that includes causing an automotive assistant executing in a vehicle's infotainment system to permit a first spontaneous communication to an occupant in a vehicle and to deny a second spontaneous communication to the occupant.

Among the practices of the method are those that include using telemetry data concerning vehicle operation to determine whether to permit the first spontaneous communication.

Also among the practices of the method are those that include selecting a mode of communication for the first spontaneous communication. Among these are practices in which the mode is selected from audio mode and visual mode.

Still other practices are those that include selecting subject matter of the spontaneous communication based on information concerning the occupant.

All of the foregoing methods are to be construed as executing in a non-abstract manner. All apparatus described above is likewise non-abstract apparatus.

As used herein, Applicant, acting as his own lexicographer, hereby defines "non-abstract" is the converse of "abstract" as the Courts have defined the term as of the filing date of this application. Notice is hereby given that any person who construes the claims to be other than "non-abstract" is construing the claims in a manner that is not in light of the specification.

As used herein, an occupant of the vehicle is either a passenger or a driver.

The infotainment system described herein is tangible and is of non-abstract form. During operation, the infotainment system described herein consumes energy and generates waste heat. As such, it affects the physical environment in a non-abstract way.

The methods and systems described herein are non-abstract methods and systems. All descriptions of abstract methods and systems have been omitted. Accordingly, the claims can only be construed to cover non-abstract methods and systems.

DETAILED DESCRIPTION

Figure 1:
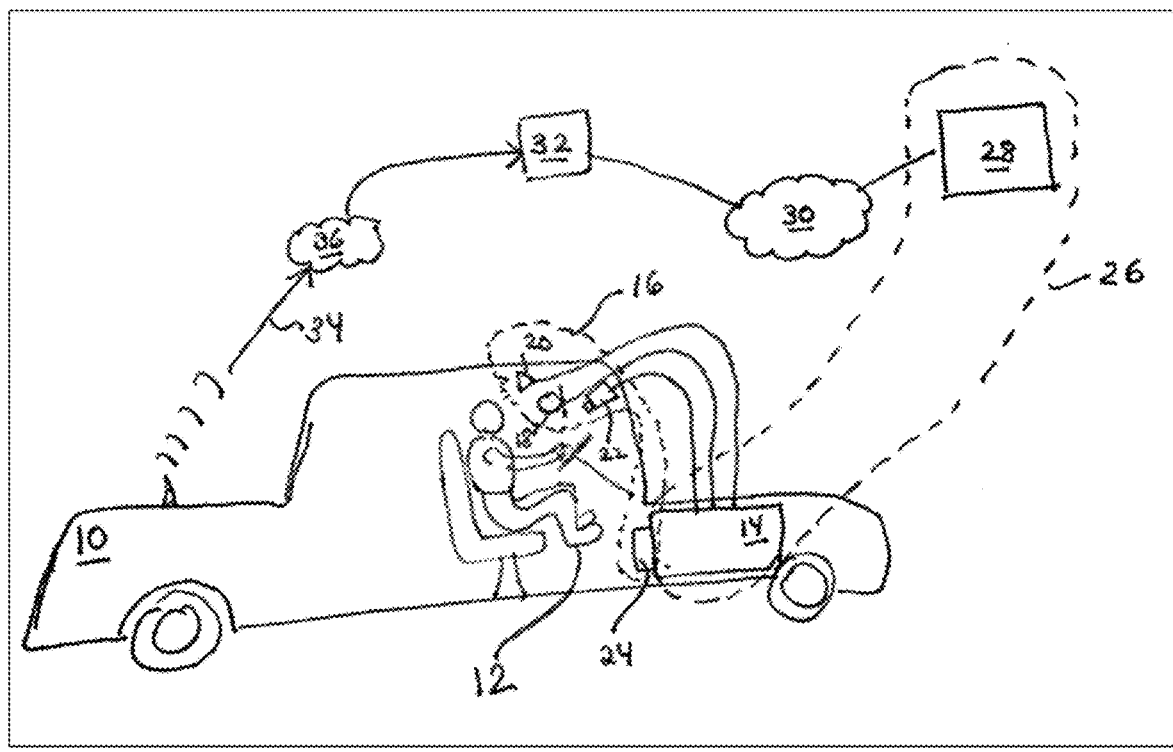
FIG. 1 shows a distributed infotainment system for implementing an automotive assistant.

FIG. 1 shows a passenger vehicle 10 having an occupant 12. The passenger vehicle 10 includes a head unit 14 having a user interface 16 for communicating with the occupant 12. Such communication can take place using one or more communication modes, such as speech, by observing an occupant's gestures, through various sounds, through a keyboard or stylus interface, or any combination thereof. To permit communication in multiple modes, the vehicle 10 has one or more devices selected from the group consisting of microphones 18, loudspeakers 20, a camera 22, and a touch-screen display 26.

In the illustrated embodiment, the head unit 14 is a constituent of a distributed infotainment system 24 that also includes a remote server 28. The head unit 14 and the remote server 28 communicate via a wide-area network 30. The remote server 28 is also in communication with a telematics server 32 via the wide-area network. The telematics server 32 routinely receives telemetry data 34 from the vehicle 10 via a cellular network 36.

Figure 2:
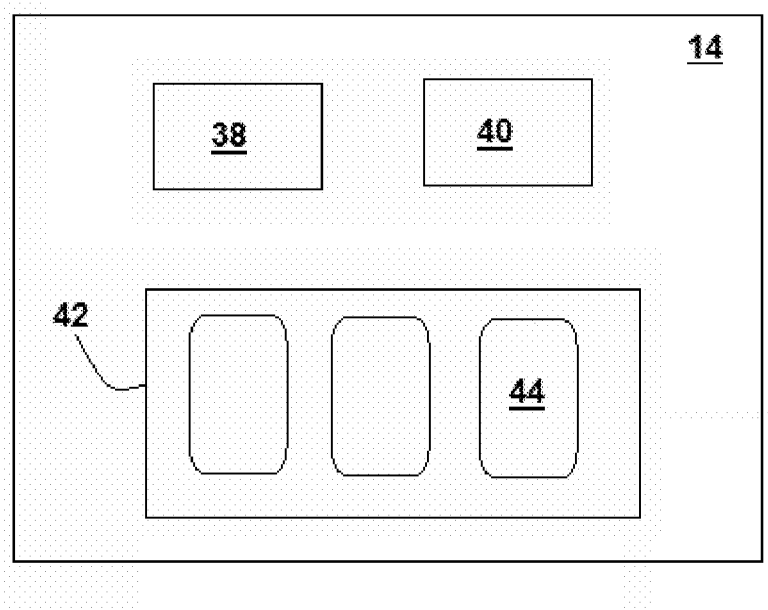
FIG. 2 shows details of the head unit shown in FIG. 1.

As shown in FIG. 2, the head unit 14 includes a processor 38 and a memory 40. The processor 38 and memory 40 cooperate to execute any of a variety of applications 42. Among these applications is an automotive assistant 44, as shown in FIG. 2. Unlike a conventional automotive assistant, which passively waits for a command, the automotive assistant 44 is proactive. As such, the automotive assistant 44 is configured to spontaneously initiate communication with the occupant 12.

A conventional automotive assistant has the luxury of knowing that its communications will be of interest. After all, if the occupant 12 were not interested in receiving a communication, the occupant 12 would never have initiated the communication in the first place.

In contrast, an automotive assistant 44 that attempts to be proactive faces an entirely new problem: how to predict whether an occupant 12 is likely to welcome a spontaneous communication. Unlike a conventional automotive assistant, which is merely expected to provide information to the occupant 12 on demand, the automotive assistant 44 must know what sort of information the occupant 12 may wish to know, when to deliver such information, and how to deliver it. The automotive assistant 44 is therefore expected to possess discretion in timing, content, and delivery mode.

Figure 3:
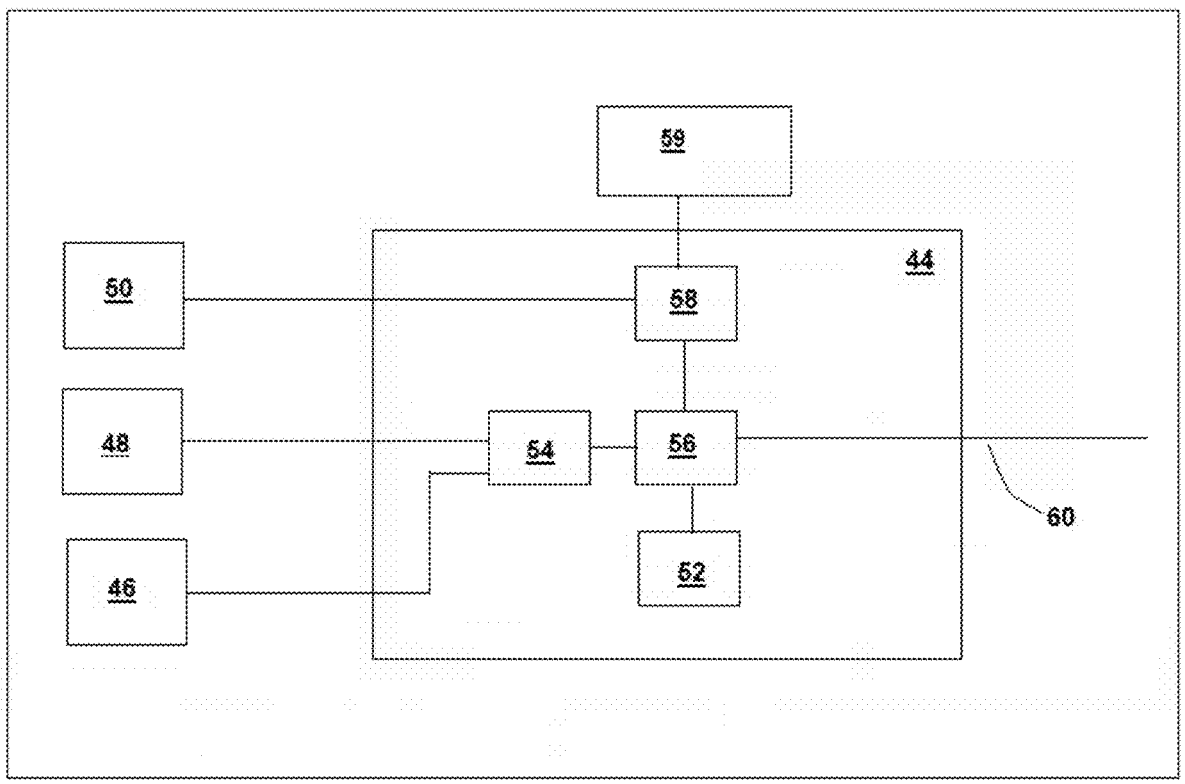
FIG. 3 shows details of the automotive assistant of FIG. 1.

Referring to FIG. 3, the automotive assistant 44 receives occupant information 46, status information 48, and candidate information 50. Within the automotive assistant 44 are a pulse module 52, proactive module 54, a dialog manager 56, and a presentation manager 58, all of which cooperate in implementing rules for deciding whether or not to initiate a spontaneous communication.

The pulse module 52 provides a periodic signal to the dialog manager 56. In response to this signal, the dialog manager 56 causes the proactive module 54 to inspect the status information 48 and the occupant information 46. Based at least in part on one or both of the status information 48 and the occupant information 46, the proactive module 54 determines whether the occupant 12 is likely to welcome a spontaneous communication.

The status information 48 comprises information concerning the vehicle's state and the occupant's state. For example, the fact that the occupant 12 is engaged in a high-speed car chase would be recorded in the status information 48. Such information may be useful in determining whether the occupant 12 would welcome a spontaneous communication.

In some embodiments, status information 48 is obtained directly from sensors in the vehicle 10. In other embodiments, status information is available a result of inspecting telemetry data 34. This telemetry data 34 includes the vehicle's position, acceleration, and velocity. It also includes time-varying operational parameters such as fuel level, exterior temperature, and engine speed.

The candidate information 50 comprises information that is potentially of interest to the occupant 12. Such information is available to the remote server 28 after interrogating various on-line information sources. Examples of such information would include the existence of a tornado watch, the existence of a clearance sale at a particular hardware store. the existence of heavy traffic at a particular location, the availability of tickets to a local symphony's upcoming concert, current trading prices of various securities, and, in general, any information that would be available to a person having a web browser and an internet connection.

The occupant information 46 comprises information that is useful for filtering the candidate information 50 to identify that information that is most likely to interest the occupant 12. Such information includes the occupant's driving habits, the occupant's personal information, such as age, gender, hobbies, and the like, as well as historical interactions with the automotive assistant 44. In some embodiments, the occupant information 46 is constantly being updated based on observations of the occupant's behavior. Such information is likely to be useful in identifying subject matter for spontaneous communication.

In general, occupant information 46 is information that provides a basis for identifying items of candidate information 50 that are more likely to interest the occupant. For example, the occupant information 46 may indicate that the occupant has frequently stopped at hardware stores, thus raising the probability that information concerning the clearance sale would be of interest.

In effect, there exists a time-varying utility function that yields a probability that the occupant 12 will find particular candidate information 50 of interest at that time. The occupant information 46 provides a basis for estimating the utility function. The proactive module 54, the dialog manager 56, and the presentation manager 58 then cooperate to determine whether a spontaneous announcement should be made, and if so, when that announcement should be made and what mode of communication should be used to make it.

Upon confirming that no impediment exists to spontaneous communication, the proactive module 54 notifies the dialog manager 56 that such a communication is permissible. The next step is to assess the priority of the subject matter to be communicated so that a suitable presentation mode can be selected. This is carried out by the presentation manager 58. To assist in formulating the communication, the presentation manager 58 has access to a question-and-answer engine 59 that is configured to execute both semantic question-analysis and deep learning-based answer selection. Once the presentation manager 58 has selected a suitable mode of communication, the automotive assistant 44 provides output data 60 indicative of the announcement and a selected mode for the announcement.

As an example of timing discretion, the dialog manager 56 may learn, from the candidate information 50 and the status information 48, that a tornado watch is in effect in the area in which the vehicle 10 is located. Such information would reasonably be of interest to the occupant. However, the proactive module 54 may recognize, from the status information 48, that the occupant is in the midst of an animated conversation with another occupant or on the telephone. Such information could be obtained by monitoring ambient cabin noise levels through the microphones. Having detected such activity, the proactive module 54 would exercise timing discretion to cause the automotive assistant 44 to wait until a more opportune moment to make a spontaneous communication.

An example of content discretion would arise under the same circumstances if, for example, the dialog manager 56 learns, from the status information 48, that the vehicle 10 has begun to move away from the area in which tornado activity is expected. In such cases, the dialog manager 56 would reasonably infer that this information would not be of interest to the occupant. In an exercise of content discretion, the dialog manager 56 would cause the automotive assistant 44 would refrain from spontaneous communication on this subject matter.

An example of modal discretion could also arise in similar circumstances. For example, if the dialog manager 56 recognizes that the center of tornado activity is miles away, the presentation manager 58 will exercise modal discretion by causing the proactive automotive unit to unobtrusively present it on a display. On the other hand, if it learns that a tornado has touched down less than a mile away, the presentation manager 58 will exercise its modal discretion to cause the automotive assistant 44 to sound a tone over the loudspeaker followed by an announcement made using a suitably stentorian voice.

Figure 4:
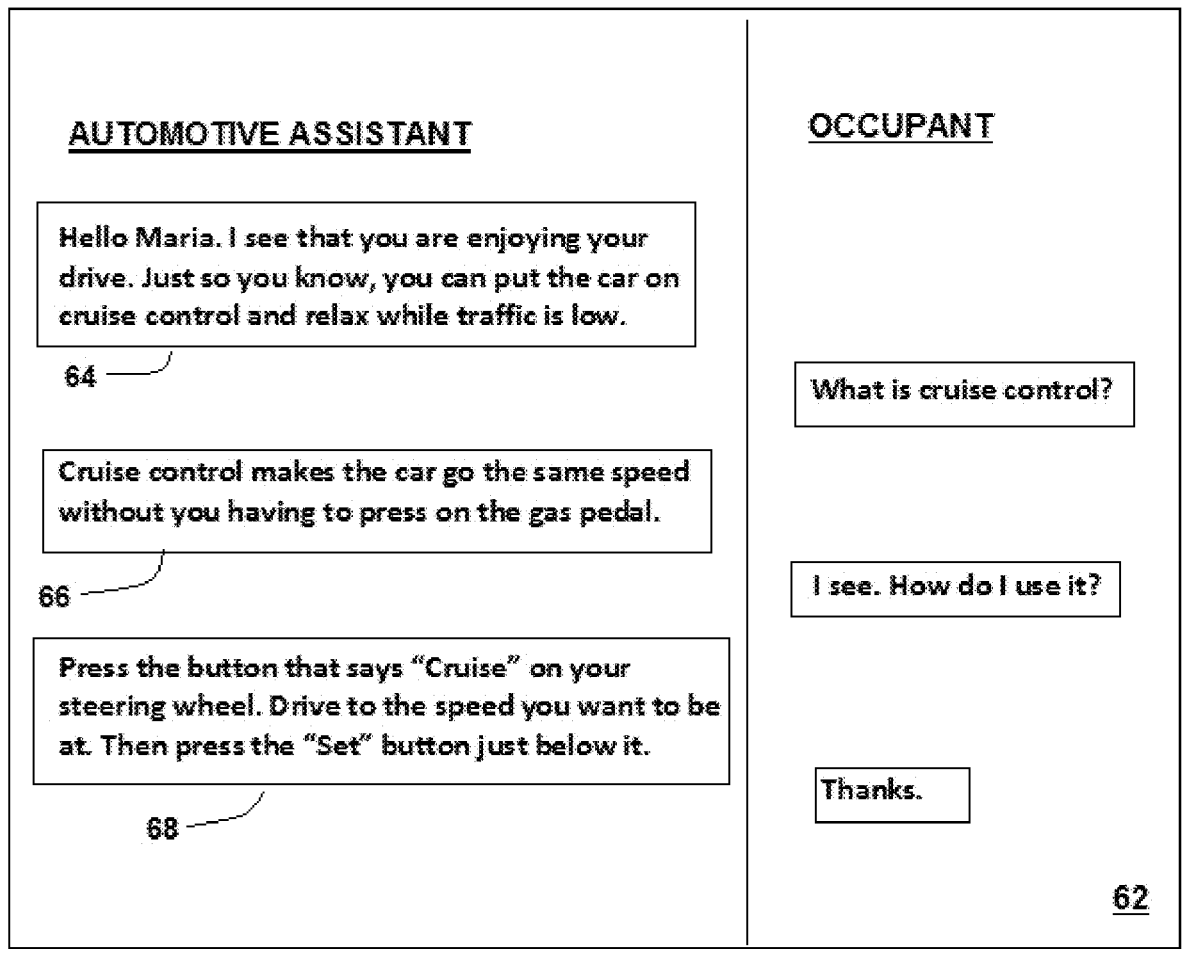
FIG. 4 shows an exemplary dialog with the automotive assistant of FIG. 1.

A useful application of the automotive assistant 44 is that of informing the occupant about features that the occupant may not be aware of. FIG. 4 shows an example of a dialog that might ensue while an occupant 12, who has never used cruise control, is driving on a lonely stretch of highway that would be ideal for using cruise control.

Prior to the dialog 62 shown in FIG. 4, the automotive assistant 44 will have recognized, based on the status information 48, that the circumstances are ideal for using cruise control. The automotive assistant 44 will also have inspected the occupant information 46 and learned that never once has this occupant 12 ever activated cruise control. Based on this information, the automotive assistant 44 infers that the occupant 12 is simply not aware of cruise control. Based on this inference and the absence of any circumstances that would inhibit spontaneous communication, the automotive assistant 44 begins a spontaneous communication 64 using the speech interface.

As is apparent from FIG. 4, the occupant 12 has apparently welcomed spontaneous communication 64. Having detected the occupant's interest level, the automotive assistant 44 then provides a description 66 of what a cruise control is. In response to the occupant's further inquiry, the automotive assistant 44 proceeds to describe the use 68 of cruise control.

The automotive assistant 44 makes use of numerous components of the distributed infotainment system. These components are shown in FIG. 4.

Figure 5:
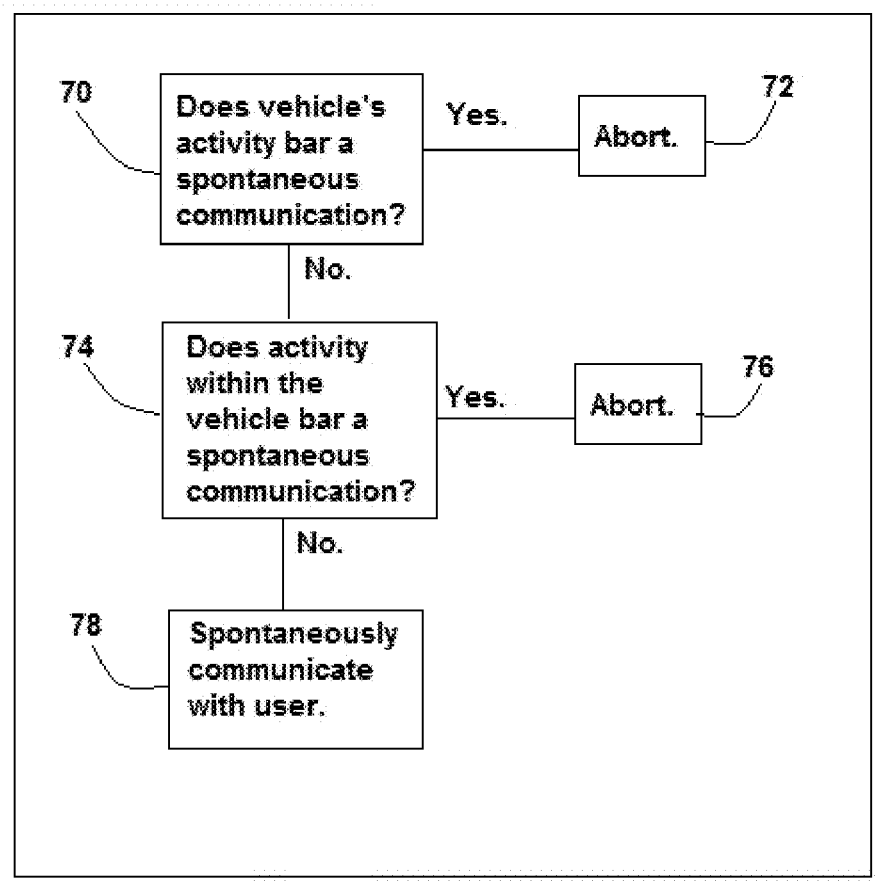
FIG. 5 is a flow chart used by the automotive assistant of FIG. 1 to determine whether spontaneous communication is warranted.

FIG. 5 shows a procedure used by the automotive assistant 44 to determine whether spontaneous communication is appropriate. The procedure begins by determining whether the vehicle's state makes such a communication undesirable (step 70). Examples of impediments to a spontaneous communication include heavy traffic or an approach to a complex traffic circle or interchange. Should such an impediment be identified, the procedure aborts (step 72). Should there be no impediment based on the vehicle's state, the procedure continues by monitoring the vehicle's interior to identify any impediments to spontaneous communication that arise from activity within the vehicle (step 74). Examples include detection of animated conversation or a telephone call. Should an impediment be detected, the procedure aborts (step 76). Alternatively, a spontaneous communication takes place (step 78).

The particular communication mode chosen by the presentation manager 58 depends on both an estimate of the extent of the occupant's cognitive load and on the urgency of the spontaneous communication's subject matter. For subject matter of low urgency, the mode selector authorizes the use of a gentle tone and perhaps an icon on a display to carry out the spontaneous communication. For more urgent subject matter, the presentation manager 58 authorizes a speech communication, provided the occupant's cognitive load falls below a threshold. In cases of exceptional urgency, the presentation manager 58 authorizes speech communication without considering the occupant's cognitive load.

Having described the invention and a preferred embodiment thereof, what is claimed as New and Secured by Letters Patent is:

1. An apparatus comprising an infotainment system in a vehicle, said infotainment system comprising
  a proactive automotive assistant that executes a first action and a second action,
  wherein said first action is that of permitting spontaneous communication to an occupant in said vehicle and said second action is that of providing information indicating that spontaneous communication with said occupant is impermissible,
  wherein said automotive assistant is configured to receive information selected from the group consisting of vehicle-status information concerning operation of said vehicle and occupant-status information concerning said occupant and to base said first and second actions at least in part on said information, wherein said spontaneous communication is a communication that draws said occupant's attention to a feature of said vehicle, and wherein said automotive assistant receives candidate information and occupant information, wherein said occupant information provides a basis for estimating a time-varying utility function that yields a probability that the occupant will find said candidate information of interest at a particular time.

2. The apparatus of claim 1, wherein said information is said vehicle-status information.

3. The apparatus of claim 2, wherein said vehicle-status information comprises information indicating that said vehicle has transitioned from operating in first traffic to operating in second traffic, wherein said second traffic is heavier than said first traffic.

4. The apparatus of claim 2, wherein said vehicle-status information comprises information indicating said vehicle's trajectory.

5. The apparatus of claim 1, wherein the automotive assistant recognizes, based on said vehicle-status information, that circumstances are suitable for using said feature and, upon recognizing that spontaneous communication is permissible, said automotive assistant spontaneously draws said user's attention to said feature.

6. The apparatus of claim 1, wherein said infotainment system comprises a menu structure and said feature can be found in said menu structure.

7. The apparatus of claim 1, further comprising a pulse module that provides a periodic signal that causes inspection of said vehicle-status information and said occupant-status information.

8. The apparatus of claim 1, further comprising a dialog manager that causes said proactive automotive assistant to inspect said vehicle-status information and said occupant-status information.

9. The apparatus of claim 1, further comprising a dialog manager and a pulse module that provides a periodic signal to said dialog manager in response to which said dialog manager causes said proactive automotive assistant to inspect said vehicle-status information and said occupant-status information to determine whether said occupant is will welcome said spontaneous communication.

10. The apparatus of claim 1, wherein, after having executed said first action, said automotive assistant executes a third action, said third action comprising selecting a communication mode for spontaneous communication.

11. The apparatus of claim 1, wherein said vehicle-status information comprises telemetry data that comprises said vehicle's position, acceleration, and velocity.

12. The apparatus of claim 1, wherein said vehicle-status information comprises telemetry data that includes fuel level, exterior temperature, and engine speed.

13. The apparatus of claim 1, wherein said feature of said vehicle is a feature that resulted from an over-the-air update to the said infotainment system.

14. An apparatus comprising an infotainment system in a vehicle, said infotainment system comprising a proactive automotive assistant that executes a first action and a second action, wherein said first action is that of permitting spontaneous communication to an occupant in said vehicle and said second action is that of providing information indicating that spontaneous communication with said occupant is impermissible, wherein said automotive assistant is configured to receive information selected from the group consisting of vehicle-status information concerning operation of said vehicle and occupant-status information concerning said occupant and to base said first and second actions at least in part on said information, wherein said spontaneous communication is a communication that draws said occupant's attention to a feature of said vehicle, wherein said automotive assistant receives occupant information and candidate information, said candidate information resulting from a remote server having interrogated an on-line information source and occupant information, and wherein said automotive assistant uses said occupant information to filter said candidate information.

15. The apparatus of claim 14, wherein the infotainment system is a distributed infotainment system that comprises a head unit and said remote server, which is in communication with said head unit via a wide-area network and wherein said head unit receives telemetry data from a telematics server that receives telemetry data from said vehicle via a cellular network.

16. A manufacture comprising a non-transitory computer-readable medium that comprises matter, wherein computer-readable medium has, encoded therein, instructions that, when executed by an infotainment system, cause the infotainment system to execute an automotive assistant that executes a first action and a second action, wherein said first action is that of permitting spontaneous communication to an occupant in a vehicle and said second action is that of suppressing spontaneous communication to said occupant, wherein said automotive assistant is configured to receive information selected from the group consisting of vehicle-status information concerning operation of said vehicle and occupant-status information concerning said occupant and to base said first and second actions at least in part on said information, wherein said spontaneous communication is a communication that draws said occupant's attention to a feature of said vehicle, wherein said automotive assistant receives candidate information and occupant information, and wherein said occupant information provides a basis for estimating a time-varying utility function that yields a probability that the occupant will find said candidate information of interest at a particular time.

17. A method comprising causing an automotive assistant executing in a vehicle's infotainment system to receive first status information, to permit a first spontaneous communication to an occupant in said vehicle based at least in part on said first status information, to receive second status information, and to deny permission for providing a second spontaneous communication to said occupant based at least in part on said second status information, wherein said first and second information are selected from the group consisting of vehicle-status information concerning operation of said vehicle and occupant-status information concerning said occupant, wherein said spontaneous communication is a communication that draws said occupant's attention to a feature of said vehicle, wherein said automotive assistant receives candidate information and occupant information, and wherein said occupant information provides a basis for estimating a time-varying utility function that yields a probability that the occupant will find said candidate information of interest at a particular time.

18. The method of claim 17, further comprising using telemetry data concerning vehicle operation in said first status information and in said second status information.

19. The method of claim 17, further comprising selecting a mode of communication for said first spontaneous communication, said mode being selected from audio mode and visual mode.

20. The method of claim 17, further comprising selecting subject matter of said spontaneous communication based on information concerning said occupant.

* * * * *